Patented Dec. 23, 1941

2,267,087

UNITED STATES PATENT OFFICE 2,267,087

MANUFACTURE OF CELLULOSE

Henry Dreyfus, London, England

No Drawing. Application May 12, 1938, Serial No. 207,577. In Great Britain June 7, 1937

2 Claims. (Cl. 92—13)

This invention relates to the manufacture of cellulose from ligno-cellulosic materials and particularly from wood.

According to the present invention wood or other ligno-cellulosic material is heated under pressure with a relatively dilute solution of alkali until a substantial proportion of the lignin has gone into solution. The concentration of the alkali solution is then increased, preferably by evaporating water therefrom, and the cellulosic material is then further heated with the more concentrated alkali solution so produced. Especially when treating wood, it is preferred to carry on the first heating step until the greater part of the lignin content of the wood has been dissolved.

As the alkali solution it is preferred to use aqueous caustic soda. The amount of caustic soda employed may be, for example, between 35 and 60% of the weight of the wood being treated, assuming a moisture content of the wood of about 10%. Preferably about 40 or 45% of caustic soda is employed. The concentration of the alkali solution in the first stage of the process may be between 2 and 5% and is preferably of the order of 3 to 4%.

The wood or other material may be heated with the dilute alkali solution to a temperature of about 120° C. or to a somewhat higher temperature, for example 140° or 160°–165° C. If desired, the temperature may be relatively low at the commencement of the treatment and may be raised either continuously or in stages as the treatment proceeds.

When the lignin in the ligno-cellulosic material has to the desired extent gone into solution in the alkali, the pressure on the alkali solution may be released and/or the temperature increased so as to allow water to evaporate from the solution. Preferably the temperature is not allowed to exceed 170° and in general it is preferred to promote evaporation by releasing the pressure on the solution rather than by increasing the temperature. The steam released in the evaporation step may with advantage be used to heat a further bath of alkali solution.

If desired, instead of or as well as removing water by evaporation, there may be added to the solution further quantities of alkali in order to increase its concentration. Such further alkali may be added in the solid form, or as a relatively concentrated aqueous or other solution.

The evaporation and/or other concentrating treatment may be continued until an alkali concentration of between 7 and 15%, and preferably between 7 and 10%, is attained. The cellulosic material is then heated for a further period with the more concentrated alkali solution, preferably at a temperature of the order of 160°–165° C., whatever temperature was employed for the treatment with the more dilute alkali. If desired, any or each stage of the treatment may be carried out under pressure higher than that produced by the solution at the temperature employed and such pressure may be produced either by adding small quantities of volatile liquids, for example ethyl alcohol or diethyl ether, or by means of nitrogen or other gas.

Although it is preferable to carry out these two heating steps and the concentration of the alkali without removing the alkali from the cellulosic material, if desired the alkali may be run off after the first step, concentrated, and returned for the second step. In such case the material may with advantage be kept immersed in hot water during the concentration. Alternatively the treatment of the invention may be carried out in a series of digesters so arranged that the dilute alkali in any one digester may be replaced by an alkali solution produced by concentrating the alkali from another digester.

The cellulose resulting from the more concentrated alkali treatment may, if desired, be subjected to a further treatment in order to remove any lignin or pentosans or other impurities which may still remain therein. For instance it may be subjected to a boil with a relatively dilute alkali, e. g. an alkali of concentration up to about 2 or 3%. Such a treatment may, with advantage, be followed with a treatment in the cold with, for example, an 8%, 10%, 12% or yet more concentrated alkali solution. Before and/or after any such alkali treatment or treatments, the cellulose may be bleached with chlorine or a hypochlorite or any other bleaching agent. Any bleaching treatment which is not followed by a treatment with alkali is preferably carried out in an alkaline medium. It is found that the new process gives a product which, especially after a suitable final purification step as already described, is eminently suitable for conversion into organic derivatives of cellulose and particularly into cellulose acetate.

If the cellulose so produced is to be esterified it is preferably first subjected to a pretreatment with an organic acid, for example acetic acid or formic acid. For example the cellulose may be treated with glacial acetic acid at a temperature between about 50° and 100° C. or it may be subjected to treatment with the vapours of acids, for example as described in U. S. Patent No. 1,831,-101. Mineral acids, for example sulphuric acid, may be employed as well as the acetic or other organic acid and such a process is described in U. S. Patent No. 2,072,249. If desired, the mineral acid and optionally also the organic acid may be neutralised, for example with ammonia or an organic base or a salt of a weak acid such as sodium acetate, before the cellulose is esterified.

Besides being very useful for conversion into cellulose acetate and other organic derivatives of cellulose the new product is an excellent starting material in the manufacture of viscose solutions, cuprammonium solutions and other cellulose solutions, and of cellulose nitrate. It may also be employed for the manufacture of paper or other products comprising a fibrous cellulose, especially when such products are desired having a very high degree of purity.

The following examples illustrate without in any way limiting the invention.

Example 1

Spruce chips with a moisture content in the neighbourhood of 10% are heated with 13 times their weight of a 3½% caustic soda solution at 160° C. until the greater part of the lignin has been dissolved. The pressure on the liquor is then released until half the water has evaporated, heat being supplied to provide for the heat of vaporisation, and the wood and alkali are then further heated for about 2 hours at 160°-165° C. The cellulose obtained may be bleached and, if it is to be used in the manufacture of good quality cellulose acetate, is further purified by boiling at about 130° C. with a 1% caustic soda solution, and is then treated in the cold with a 12% caustic soda solution. Before being acetylated it should be pretreated for some hours with anhydrous acetic acid.

Example 2

The wood is treated as described in Example 1, except that the first heating step commences at 120° C., the temperature rising at about 10° C. per hour to 160° C., at which value it is maintained for a short time before the pressure is released and the alkali concentrated.

Having described my invention, what I desire to secure by Letters Patent is:

1. Process for the production of cellulose from wood, which comprises dissolving out the greater part of the lignin contained in the wood by heating the wood at a temperature of 120–165° C. with a 2–5% solution of caustic soda, containing an amount of alkali equivalent to 40–45% of the weight of the wood, increasing the concentration of the alkali solution to between 7 and 15% by evaporating water therefrom while it is in contact with the wood, and further heating the wood at a temperature of 160–165° C. with the more concentrated alkali so produced.

2. Process for the production of cellulose from wood, which comprises dissolving out the greater part of the lignin contained in the wood by heating the wood at a temperature rising from 120 to 165° C. with a 2–5% solution of caustic soda, containing an amount of alkali equivalent to 40–45% of the weight of the wood, reducing the pressure on the alkali solution while maintaining its temperature until the alkali has reached a concentration of from 7–15%, and further heating the wood at a temperature of 160–165° C. with the more concentrated alkali solution so produced, the wood being immersed in the alkali solution throughout the treatment.

HENRY DREYFUS.